United States Patent
Nampon et al.

(10) Patent No.: US 12,012,987 B2
(45) Date of Patent: Jun. 18, 2024

(54) HOLDER FOR INSERT AND ASSEMBLY INCLUDING THE HOLDER AND INSERT

(71) Applicant: HellermannTyton S.A.S., Trappes (FR)

(72) Inventors: Damien Nampon, Ablon-sur-Seine (FR); Pascal Cherdo, Beynes (FR)

(73) Assignee: HellermannTyton S.A.S., Trappes (FR)

( * ) Notice: Subject to any disclaimer, the term of this patent is extended or adjusted under 35 U.S.C. 154(b) by 514 days.

(21) Appl. No.: 17/245,492

(22) Filed: Apr. 30, 2021

(65) Prior Publication Data

US 2021/0341010 A1   Nov. 4, 2021

(30) Foreign Application Priority Data

May 1, 2020 (EP) .................................... 20315233

(51) Int. Cl.
*F16B 43/00* (2006.01)
*F16B 41/00* (2006.01)

(52) U.S. Cl.
CPC ........ *F16B 41/002* (2013.01); *F16B 2200/20* (2018.08)

(58) Field of Classification Search
CPC ..... F16B 5/0664; F16B 21/073; F16B 41/002
USPC ........................................................ 411/536
See application file for complete search history.

(56) References Cited

U.S. PATENT DOCUMENTS

| | | | | |
|---|---|---|---|---|
| 4,768,259 A * | 9/1988 | Rock | ..................... | E05D 5/0276 411/521 |
| 8,877,113 B2 * | 11/2014 | Ishizu | ...................... | F16B 2/20 264/318 |
| 2003/0230044 A1 | 12/2003 | Peterson | | |
| 2006/0193710 A1 * | 8/2006 | Benoit | .................. | F16B 41/002 411/104 |
| 2011/0219588 A1 * | 9/2011 | Inoue | .................... | F16B 5/0657 24/458 |
| 2013/0071706 A1 * | 3/2013 | Lee | ..................... | H01M 10/486 429/62 |
| 2013/0259595 A1 | 10/2013 | Hiramatsu | | |
| 2014/0191526 A1 | 7/2014 | Lauxen et al. | | |
| 2015/0113773 A1 * | 4/2015 | Iwahara | ................ | F16B 5/0664 24/594.11 |

(Continued)

FOREIGN PATENT DOCUMENTS

| CN | 103029641 A | 4/2013 |
|---|---|---|
| DE | 102009011547 A1 | 9/2010 |
| FR | 3033848 A1 | 9/2016 |

OTHER PUBLICATIONS

CN Office Action for 202110489835.8; dated Jul. 18, 2022, 10 pages.

(Continued)

*Primary Examiner* — Gary W Estremsky
(74) *Attorney, Agent, or Firm* — Billion & Armitage

(57) ABSTRACT

A holder for an insert includes a first housing configured to receive the insert. The first housing extends within a plane of the holder. The holder further includes an opening configured for inserting the insert into the first housing in a direction substantially perpendicularly to the plane and a second housing configured to receive the insert, the second housing being in communication with the first housing. The second housing extends within the plane of the holder and is configured to prevent movement of the insert out of the holder in a direction perpendicular to the plane.

14 Claims, 4 Drawing Sheets

(56) References Cited

U.S. PATENT DOCUMENTS

2015/0337882 A1* 11/2015 Iwahara ................ F16B 5/0664
24/489
2016/0251082 A1* 9/2016 Shih ...................... F16B 41/002
248/636

OTHER PUBLICATIONS

English Translation of CN Office Action for 202110489835.8, 6 pages.

* cited by examiner

HOLDER FOR INSERT AND ASSEMBLY INCLUDING THE HOLDER AND INSERT

CROSS-REFERENCE TO RELATED APPLICATION

This application claims benefit of priority to European Patent Application No. 20315233.5 filed in the European Patent Office on May 1, 2020, the entire disclosure of which is hereby incorporated by reference.

TECHNICAL FIELD OF THE INVENTION

The present disclosure relates to the field of mounting parts which are typically designed to be fastened against a support and used as accessories for holding an object such as cable channels, fixing clamps, plastic boxes or any other similar products. More specifically, the present disclosure relates to a holder for an insert and an assembly including such holder and insert.

BACKGROUND

In many fields of industry, e.g., automotive or aeronautics, it is desired to fasten parts, making up various components or designed to hold the latter, in a sustainable manner on a support. Examples of well-known fastening means include a fixing lug used as a mounting part for holding and fastening a base plate, a wiring duct, or a cable tie. Such a fixing lug typically includes a hole for receiving a screw to be screwed into a support.

During their use, the fixing lugs or other similar connectors, on which the screw or a screw-nut system is supported, are subjected to high mechanical stress. This phenomenon is all the more pronounced when the base plate or the connectors is made of a plastic material. For this reason, there are currently mounting parts including a through-hole into which an insert, such as a metal strip or bushing, is placed around the inner face of the hole so that the screw or screw-nut system rests on the edge of the insert and not only on the plastic surface of the mounting part.

Some of these inserts or metal strips are merely inserted into the through-hole of the fixing connector and have several drawbacks. First, it is not uncommon for the insert to be lost given that it can fall through the hole when the mounting part is transported or handled before being fastened on its support. Second, the insert must be dimensioned very precisely in order to fit with the through-hole. If it is too large, it will be difficult to insert it into the hole and if it is too small, there is a risk that the fixing will not be assured in a reliable manner.

Accordingly, there is a need for improving existing mounting parts in order to at least partially overcome the aforementioned issues and drawbacks.

SUMMARY

To address the above-described issues, the present disclosure provides a holder for an insert. This holder includes:
  a first housing for receiving the insert, the first housing extending within a plane of the holder,
  an opening for inserting, substantially perpendicularly to the plane, the insert into the first housing, and,
  a second housing for receiving the insert, the second housing being in communication with the first housing.
According to the present disclosure, the second housing extends within the plane of the holder and is configured to prevent movement of the insert out of the holder, in directions perpendicular to the plane.

According to the present disclosure, the second housing, which is that in which the insert is lodged in its working or final position, is advantageously reachable by the insert in a direction which is different from that allowing the insertion of the insert into the opening of holder. This means that the attachment of the insert with the holder is much more efficient than that of conventional solutions. In addition, the present disclosure may easily prevent any loosing of the insert once it is located in the second housing. Still advantageously, the present holder allows an easy and reliable assembly without the need for complex tools, or even without any mechanical assistance.

Due to the specific arrangement of the second housing relative to the opening designed for inserting the insert into the holder, it is possible to ensure a robust locking of the insert within the holder on both sides of the plane of this holder. Accordingly, the insert may, for example, be maintained locked in the holder despite a significant pulling force, without the need for over molding or stamping the insert.

According to a specific embodiment, the opening (arranged in the holder) is a through-opening.

In order to prevent the insert from being pushed or pulled out of the holder, the second housing preferably includes a plurality of protrusions for preventing movement of the insert in directions perpendicular to the plane of the holder.

According to a preferred embodiment, the first housing is separated from the second housing by a divider.

Preferably, the second housing includes two opposite sidewalls linked by a curved portion at one end of the second housing, and the first housing includes at least a portion of the opposite sidewalls.

More preferably, the holder is devoid of any elastic part.

In a further embodiment, the holder includes a plastic material.

The present disclosure also relates to an assembly including an insert and a holder complying with any of the embodiments or possible combination of such embodiments disclosed in this disclosure. More specifically, this assembly is characterized in that the insert has a U-shape configured to fit with both the first and second housings and further includes locking means for locking the insert in the second housing.

According to one embodiment, the insert further includes an elastic portion configured to be compressed when the insert is moved between the first housing and second housing.

In a preferred embodiment, the U-shape is elongated and open at one end so as to form two branches making up the elastic portion.

Preferably, each of the branches has a fork as a first locking means for engaging with one protrusion of the second housing of the holder.

According to a preferred embodiment, the fork is configured to be bent outwards so as to lock the insert in the second housing and prevent the insert from moving from the second housing to the first housing due to the divider acting as an abutment for the fork.

In a further embodiment, the insert has a hole or a recess as a second locking means located at the opposite of the open end to engage with one of the protrusions of the second housing.

Preferably, the insert includes a metallic material.

More preferably, the insert is configured to be maintained locked in the second housing against a force up to at least 12 dekanewtons (daN) applied to the insert in any direction perpendicular to the plane or substantially perpendicular to this plane.

Other embodiments and advantages will be disclosed hereafter in the detailed description.

BRIEF DESCRIPTION OF THE DRAWINGS

The present invention will now be described, by way of example with reference to the accompanying drawings, in which.

DETAILED DESCRIPTION

Figure 1:
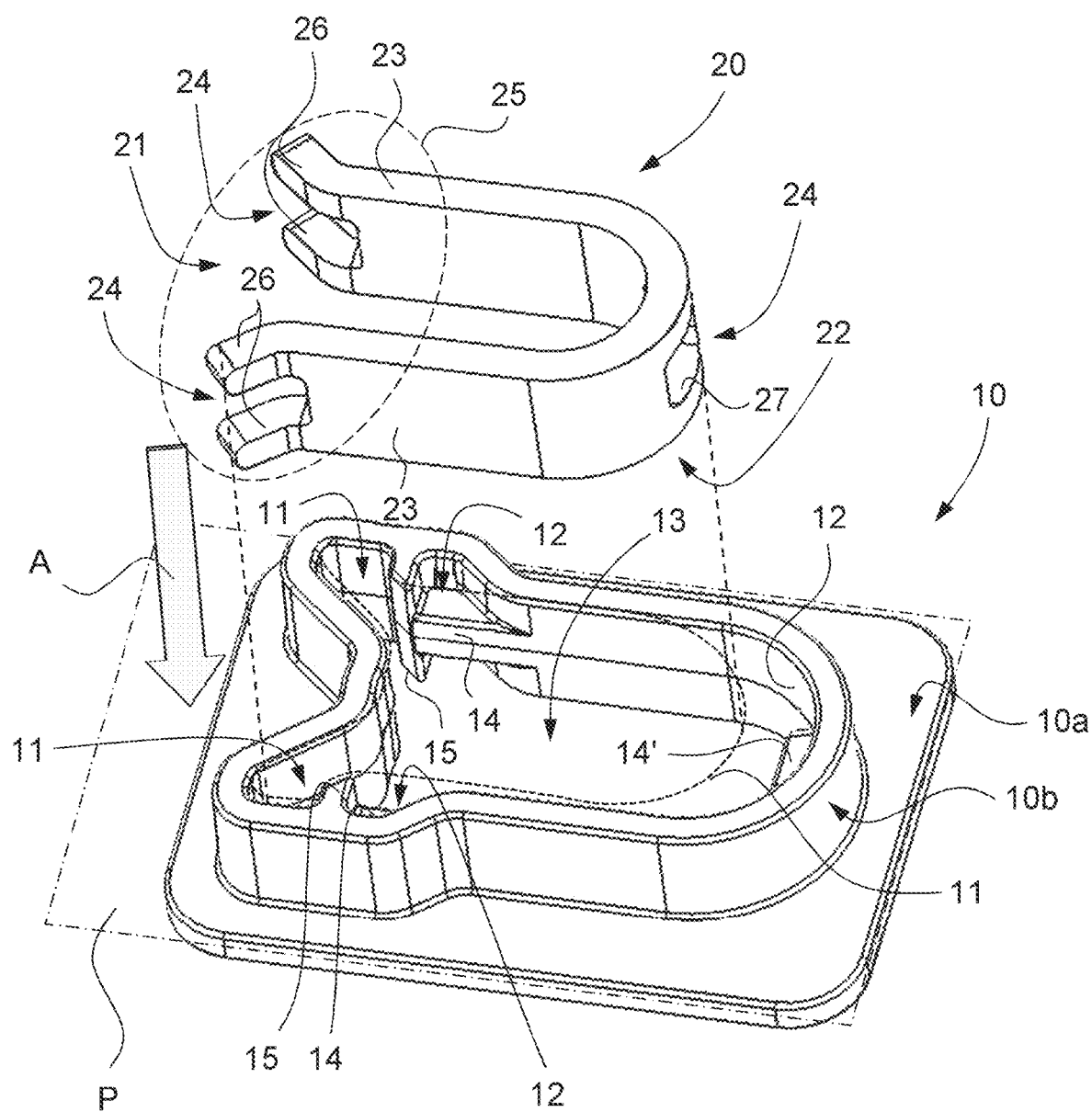
FIG. 1 is a perspective illustration of a holder and an insert for which the holder is configured, according to an embodiment of the present disclosure.

FIG. 1 illustrates an example of a holder 10 according to an embodiment of the present disclosure. In particular, FIG. 1 shows on the one hand the holder 10 at the bottom of this figure, and on the other hand an insert 20 which is configured to be inserted into the holder 10. The holder 10 has a plane P which, in the present example, is parallel to the base of the holder 10.

Figure 2:
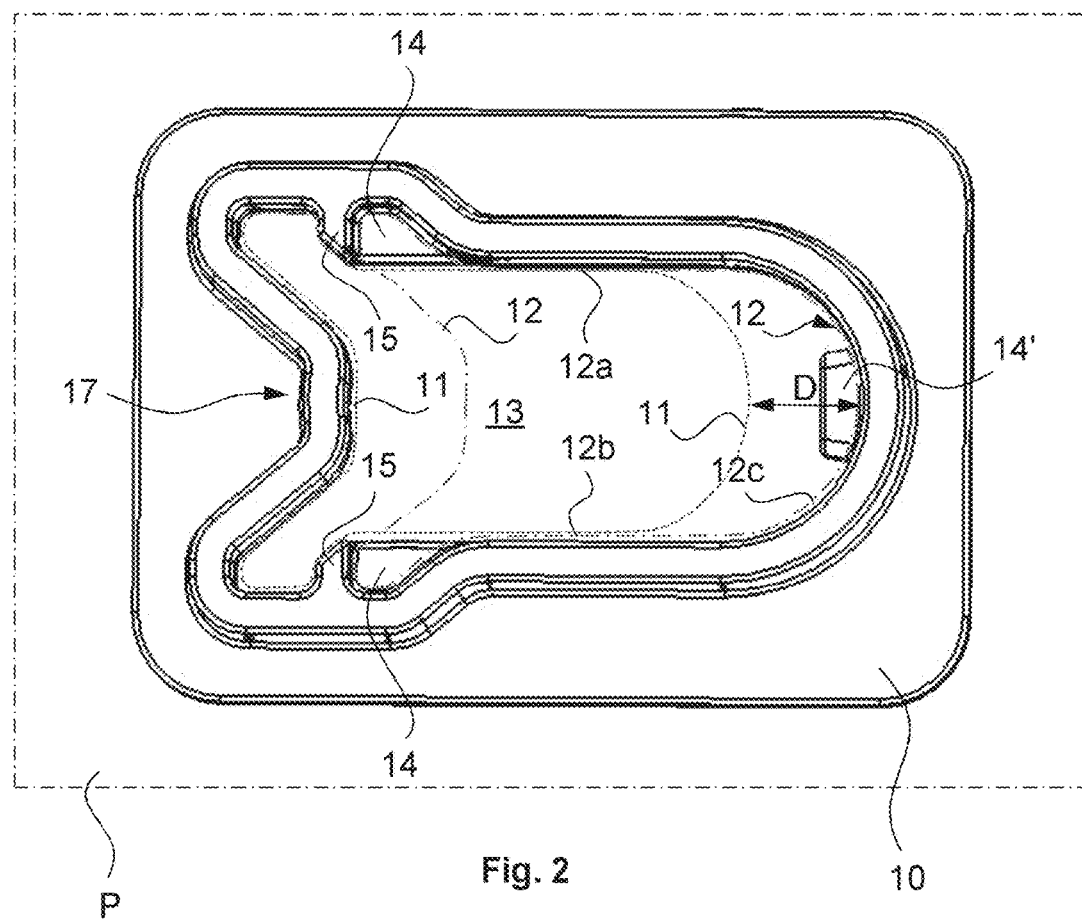
FIG. 2 is a plan view of the holder shown in FIG. 1.

FIG. 2 is a plan view of the holder 10 of FIG. 1. As better shown in FIG. 2, the holder 10 has a first housing 11 and a second housing 12, both of them being configured for receiving the insert 20. The position of the insert 20 as located in the first housing 11 is depicted with a dashed line. The first housing 11 extends within the plane P of the holder. The position of the insert 20 as located in the second housing 12 is depicted with a dot-dash line. The second housing 12 also extends within the plane P of the holder. The first and second housings 11, 12 are integral with the holder 10, in particular with a main body of the holder 10. At least a part of the main body of the holder 10 may be configured to be placed against a support (not shown). For this reason, the main body of the holder 10 may include a base 10a configured to come into contact with such a support in order to increase the stability of the holder 10. The first and second housings 11, 12 include a sidewall structure 10b extending perpendicularly from the base 10a of the holder 10. The base 10a may be a planar structure and may include a webbed portion extending laterally around the periphery of the sidewall structure 10b. The sidewall structure 10b, especially the upper or free edge of the sidewall structure 10b, is preferably used to support a nut 42 of a screw-nut system 40 shown in FIGS. 5-6. The opposite edge of the structure is attached to the base 10a of the main body of the holder 10. Accordingly, the upper or free edge of the sidewall structure 10b is preferably parallel to the base 10a.

The first and second housings 11, 12 may have an identical or similar footprint as shown in FIG. 2. The first housing 11 is configured for a first position of the insert 20 within the holder 10, and the second housing 12 is configured for a second position of the insert 20 within the holder 10. Preferably, the second housing 12 includes two opposite sidewalls 12a, 12b linked by a curved portion 12c at one end of the second housing 12, and the first housing 11 includes at least a portion of the opposite sidewalls 12a, 12b. More preferably, the sidewalls 12a, 12b are parallel to each other and the curved portion 12c may have a circular shape and preferably has a semicircular shape. Still more preferably, the lateral sidewalls 12a, 12b of the openings 13, in particular the sidewalls 12a, 12b and the curved portion 12c, are perpendicular to the plane P. It will be understood that the sidewalls 12a, 12b and the curved portion 12c are part of the sidewall structure 10b shown in FIG. 1.

As better shown in FIG. 1, the holder 10 further has an opening 13 for inserting, transversely or perpendicularly to the plane P or even substantially perpendicularly to this plane, the insert 20 into the first housing 11. The insertion of the insert 20 into the first housing 11 of the holder 10 is typically achieved in the direction of the arrow A of FIG. 1.

The second housing 12 is in communication with the first housing 11, so that it is possible to pass from one housing to another in a translational or sliding motion. Typically, the first and second housings 11, 12 are linked in a row.

According to an embodiment of the present disclosure, the second housing 12 extends within the plane P of the holder 10 and is configured to prevent the insert 20 from being moved out of the holder 10, in directions perpendicular to the plane P. In other words, the first and second housings 11, 12 are located at different locations within the same plane P, and the second housing 12 has means for preventing the insert 20 from being moved out of the holder 10 in directions perpendicular to the plane P.

According to these features, the second housing 12, which is configured for the final or working position of the insert 20, is offset relative to the opening 13 through which the insert 20 is inserted into the holder 10. Such an offset corresponds to the distance D (shown in FIG. 2) between the first housing 11 and the second housing 12.

Returning to FIG. 1, one can note that the first housing 11 is aligned with the insertion direction of the insert 20 through the opening 13, as depicted by the arrow A. Accordingly, the second housing 12 is advantageously offset from this insertion direction, thus allowing to provide the second housing 12 with efficient means for preventing the insert 20 from being removed out of the holder 10 in any direction perpendicular to the plane P or substantially perpendicular to this plane.

According to a preferred embodiment, the opening 13 is a through-opening as shown in FIGS. 1 through 4C. In one embodiment, the opening 13 through which the insert 20 is inserted into the holder 10 may be a blind opening or a partially blind opening, even if the second housing 12 is kept at least partially open in order to be crossed by a screw or a nut-screw system 40, shown in FIGS. 5 and 6, for fastening the holder 10 onto any kind of support. Indeed, if the distance D between the first and second housings 11, 12 is long enough, one may envision a case where the opening 13, and thereby the first housing 11, is blind, whereas the second housing 12 remains through to pass e.g., a screw through the holder 10.

Figure 3:
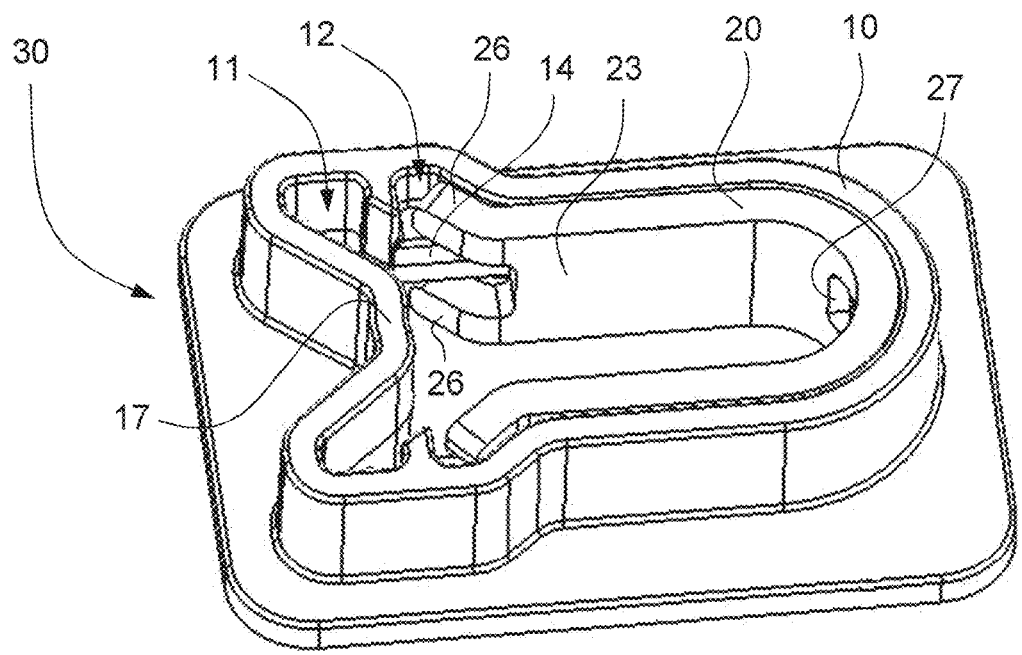
FIG. 3 is a perspective view showing the assembly of the insert and the holder.

According to another preferred embodiment, the second housing 12 has a plurality of protrusions 14, 14' for blocking the insert 20 in both sides of the plane P. Preferably, the protrusions 14 are located on the sidewalls 12a, 12b while the other protrusion 14' is located on the curved portion 12c of the second housing 12. More preferably, the protrusions 14, 14' are located halfway up the sidewalls 12a, 12b and the curved portion 12c. These protrusions 14, 14' act as means for preventing the insert 20 from being pushed or pulled out of the plane P, as shown in FIG. 3 which depicts the assembly 30 of the insert 20 and its holder 10. Because the holder 10 allows the insert 20 to be inserted therein in a first direction, shown by the arrow A (in order to reach the first housing 11), and then to slide the insert 20 in a second direction, different from the first direction (in order to reach the second housing 12), it is possible to provide the second housing 12 with particularly robust protrusions 14, 14', as better shown in FIG. 1.

Indeed, it should be noted that in such a configuration the protrusions 14, 14' may advantageously not be engaged during the positioning of the insert 20, namely during the time interval required for lodging the insert 20 from the outside of the holder 10 to the second housing 12 within the holder 10. This means that the protrusions 14, 14' can benefit from a very robust architecture without affecting the insertion of the insert 20 into the holder 10 or interfering with the insert 20. As a result, once lodged in the second housing 12, the insert 20 can be secured in the holder 10 with a great efficiency against a tearing force acting in any direction perpendicular to the plane P or transversely to this plane.

In a variant, instead of providing the second housing 12 with a plurality of protrusions, it may be possible to provide the second housing with recesses for blocking the insert in both sides of the plane P. In this case, the insert may be provided with projections that may each engage one recess.

According to the embodiment shown in the Figures, the first housing 11 is separated from the second housing 12 by a divider 15. Preferably, the protrusions 14 and the divider 15 define the division between the first and second housings 11, 12. Although optional, such a divider 15 advantageously allows to lock the insert 20 in a direction parallel to the plane P given that it prevents the insert 20 from sliding back to the first housing 11 once it has reached the second housing 12. As a result and due to the divider 15, there is no longer any risk of losing the insert 20 once it is assembled in its final position in the holder 10. Referring to FIG. 2 for example, the divider 15 may include a protruding portion extending laterally into the center of the holder 10 from both inner walls of the opening 13. The protruding portion defines the separation of the first and second housings 11 and 12.

Figure 4:
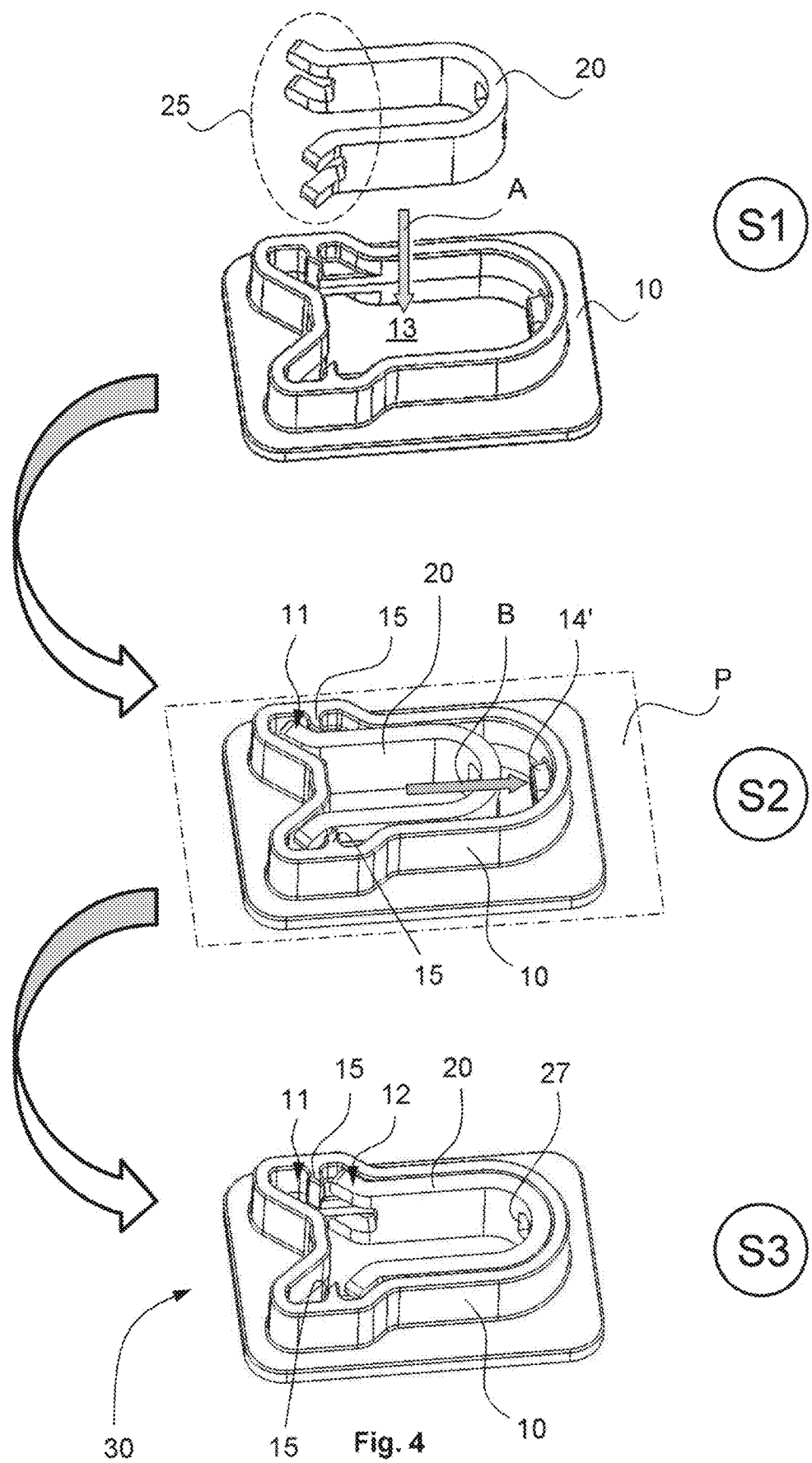
FIG. 4 is a kinematics sequence showing the steps to achieve the assembly of FIG. 3.

Another advantage provided by such a divider 15 lies in the fact that the protrusions, especially the protrusions 14, can be integrally formed with the divider 15 on the one hand, and the inner wall of the opening 13 on the other hand. Consequently, the protrusion 14 becomes stronger than a projection extending entirely outwards from the inner wall of the opening 13, i.e., protruding over the entire periphery of the projection. FIG. 4 shows a kinematics sequence for assembling the insert 20 and the holder 10, shown in the previous figures. Such an assembly is advantageously very easy to implement given that it requires only two steps between the first state S1 shown in FIG. 4 and the last state S3 shown in FIG. 4. According to the first state S1, the insert 20 is fully separated from the holder 10. In the illustration shown in FIG. 4, the insert 20 is located above the holder 10 in front of the opening 13 of the holder. As shown by the arrow A, the goal of the first step is to put the insert 20 into the holder 10, especially into the first housing 11 of the holder 10, by inserting the insert 20 into the opening 13 so as to reach the second state S2. Such an insertion is preferably achieved without effort or stress, neither on the insert 20, nor on the holder 10.

Once the insert 20 is in the first housing 11, as shown in state S2 of FIG. 4, the second step aims to slide the insert 20 within the plane P of the holder 10, especially in the direction shown by arrow B, in order to put the insert 20 into the second housing 12 of the holder 10.

Once the second step is achieved, the assembly of the insert 20 and the support is ended, as shown in the third and last state S3.

According to this kinematics sequence and due to the fact that the architecture of the holder 10 shown in this sequence includes the divider 15, one can note that the insert 20 may have to include an elastic portion 25 in order to allow it to move from the first housing 11 to the second housing 12. However, if no divider 15 is arranged between the two aforementioned housings, the insert 20 does not need to include such an elastic portion 25. For this reason, the elastic portion of the insert can be regarded as being optional, depending on the embodiment of the holder 10.

According to one embodiment, the plane P of the holder defines a plane of symmetry of the holder, as shown in FIG. 1. Therefore, such a plane may be the median plane of the holder 10. By providing a holder which is symmetric relative to both sides of the plane P, the holder may be advantageously used to equal benefit on both sides, further simplifying its use.

In a preferred embodiment, the holder 10 is devoid of any elastic component. Since the insert 20 is the main part of the assembly 30 designed to resist the tightening torque, namely to take up the forces when the assembly 30 is fastened on a support, this insert 20 is typically made of a strong material such as metal which is therefore specifically adapted for those purposes. On the other hand, the holder 10 may be made of plastic material. By not including any elastic component in the holder 10, such as elastic protrusions, the risk of breakage of one of the most sensitive parts of the holder is reduced.

Preferably, the holder 10 includes a plastic material. More preferably, the holder 10 is entirely made of plastic material, such as injected plastic material for example. Advantageously, a plastic holder can be easily adapted to other components such as plastic cable channels, fixing clamps, plastic boxes or other injected products. In addition, the shape of the holder, especially at least one of the first and second housings 11, 12, may be easily adapted for any kind of insert 20, such as round, oblong or rectangular inserts for example.

From the foregoing, one can note that the holder 10 is configured to maintain the insert 20 in a locked position in the second housing 12 in an efficient manner, without the need for over molding or stamping the insert. Furthermore, the holder 10 is configured to still allow the insertion of the insert 20 from one lateral side of the holder 10, namely a profile insertion in a direction perpendicular to the plane P of the holder 10. In addition, since the protrusions 14, 14' can be strong and sized appropriately, there is no need to have tight manufacturing tolerances between the insert 20 and the holder 10, especially between the insert 20 and at least one of the opening 13, the first housing 11 and second housing 12 of the holder 10. Accordingly, the holder of the present disclosure is not only efficient and reliable but also cost-effective.

The present disclosure also relates to the assembly 30 including the insert 20 and the holder 10 according to any of the embodiments or variants disclosed therein, or according to any possible combination of such embodiments. The assembly 30 is characterized in that the insert 20 has a U-shape configured to fit with both the first and second housings 11, 12 and further has locking means 24 for locking the insert in the second housing 12. These locking means 24 are shown e.g., in FIG. 1 and will be detailed later in the present description.

According to a preferred embodiment, the insert 20 further has an elastic portion 25 which is adapted to be compressed when the insert 20 is moved between the first housing 11 and the second housing 12, as explained in connection with the kinematics sequence shown in FIG. 4. Preferably, the elastic portion 25 has a released state when the insert 20 is at least in the second housing 12 of the holder 10. This released state corresponds to the state of the insert 20 when no stress or force is applied thereon. Accordingly, the released state is that shown in FIG. 1 when the insert 20 is located outside of the holder 10.

More preferably, the elastic portion 25 of the insert 20 has also a released state in the first housing 11 of the holder 10. Advantageously, no stress is applied onto the insert 20 as long as the assembly 30 is not used, namely fastened to a support, except when passing the divider 15, if any.

As shown in FIGS. 1, 3 and 4, the U-shape of the insert 20 is elongated and open at one end 21 so as to form two branches 23 making up the elastic portion 25. Preferably, the insert 20 has a U-shape with prongs, as locking means 24, extending outwardly at the open end 21.

Preferably, each of the branches 23 has a fork 26 as a first locking means 24 for engaging with one protrusion 14 of the second housing 12 of the holder 10. Advantageously, providing a locking means in the form of such a fork 26, instead of a hole, allows to engage the two longitudinal ends of the protrusion 14 with the body of the holder 10, especially to the divider 15 and to the inner wall of the opening 13. Accordingly, the protrusion 14 becomes stronger and can resist higher stresses, in particular in the directions perpendicular to the plane P of the holder.

In a further preferred embodiment, the fork 26 is bent outwards, so as to lock the insert 20 in the second housing 12 and prevent the insert from moving back from the second housing 12 to the first housing 11 due to the divider 15 acting as an abutment for the fork 26. Advantageously, such a configuration avoids the loss of the insert 20, once it is placed in its holder 10, and further locks the insert 20 in all directions.

According to another embodiment, the insert has at least one hole 27 or a recess as a second locking means 24 located at an opposite end 22 of the open end 21. This hole 27 is designed to engage with one of the protrusions 14 of the second housing 12, especially with the protrusion 14' better shown in FIG. 2. Due to the second locking means 24, and in particular due to its position relative to the positions of the first locking means in the form of the forks 26, the insert 20 is firmly locked using three locking means 24 well distributed in the plane P of the holder 10. Furthermore, given that the hole 27 is designed to engage with the protrusion 14' within the plane P or within a plane parallel to the plane P, there is advantageously no stress applied to the insert 20 or the holder 10, during the engagement of these elements. As a result, the protrusion 14' can be designed to be quite large and therefore particularly strong, so as to resist significant forces applied to the insert 20, transversely to the plane P.

According to one embodiment, the insert 20 includes a metallic material. Preferably, the insert 20 is entirely made of metallic material, such as aluminum, steel, stainless steel or any other metal or metal alloy. Nevertheless, the insert 20 may also be made from any other material.

According to another embodiment of the assembly 30, the insert 20 is designed to be maintained locked in the second housing 12 against a force up to at least 12 daN applied onto the insert 20 in any direction perpendicularly to the plane P or substantially transversely to this plane. Such a significant value of stress can be reached, without over molding or stamping operations, due to the protrusions 14, 14' of the holder 10 which, according to the present disclosure, can be advantageously oversized relative to conventional solutions. This is mainly due to the fact that the protrusions 14, 14' of the holder 10 and the corresponding locking means 24 of the insert 20 are not engaged during the insertion of the insert 20 into the second housing 12, i.e., into its final position within the holder 10. This results to the specific architecture of the assembly 30, especially that of the holder 10.

Figure 5:
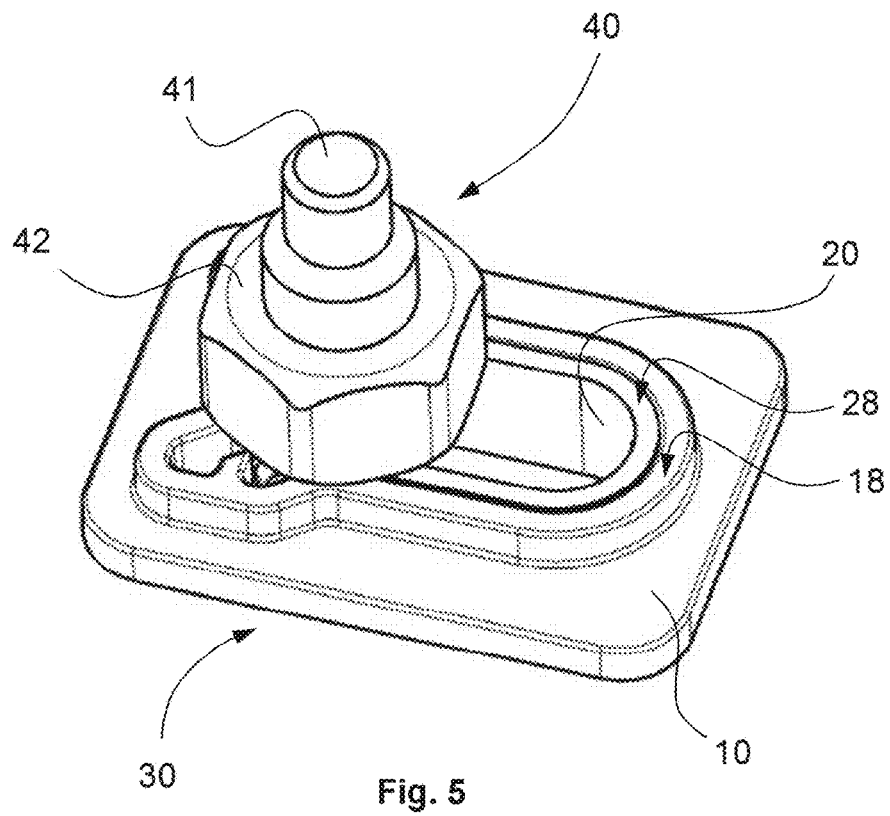
FIG. 5 is a perspective view showing the assembly of FIG. 3 fastened by a screw-nut system, according to an embodiment of the present disclosure.
Figure 6:
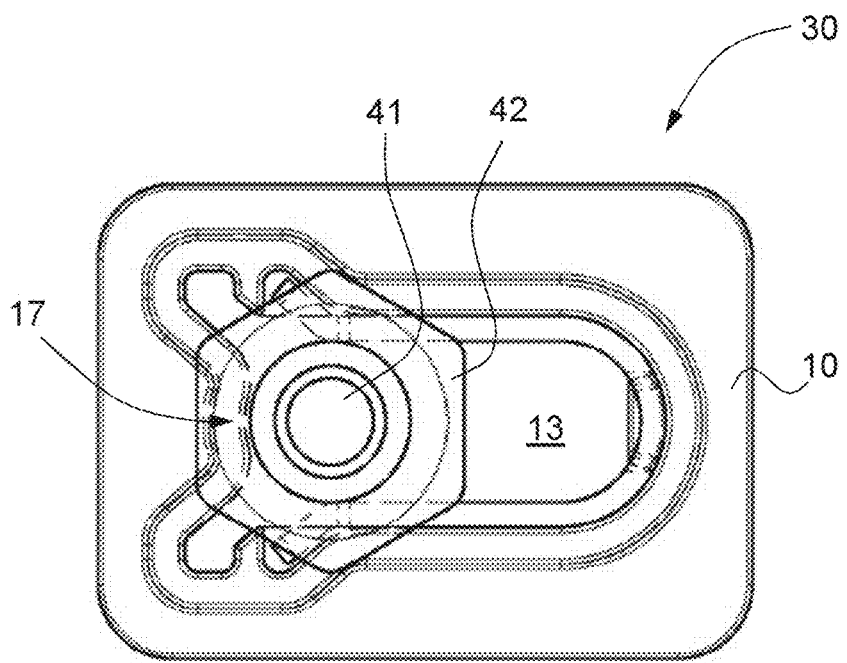
FIG. 6 is a plan view of FIG. 5.

FIGS. 5 and 6 respectively illustrate the assembly 30 as it appears when it is fastened by a screw-nut system 40, taken as example of a fixing means, according to an embodiment of the present disclosure. The system 40 includes at least a screw 41 and a nut 42. The screw 41 is designed to go through the opening 13 in order to be fastened on a support not shown, below the holder 10. The nut 42 is typically designed to tight the assembly 30 against this support. To this end, the nut 42 rests against edges 18, 28 respectively of the holder 10 and the insert 20. Due to the strength of the insert 20, the majority of the force applied onto the assembly 30 by the nut 42 is supported by the insert 20 via its edges 18. Accordingly, an efficient tightening force can be provided by the screw-nut system for fastening the assembly 30 without damaging or even destroying the holder 10.

FIG. 6 shows a plan view of FIG. 5. Referring to FIG. 6, one the holder 10 may further include at least one bulge 17 located on the periphery or around the opening 13. Such a bulge 17 may be a lump, a swelling, a bump or any similar projection. The bulge 17 is preferably located at one end of the opening 13 if the latter is not circular, and more preferably where the open end 21 of the insert is located when it is lodged in the holder 10.

The bulge 17 acts as a stop for the screw 41, in order to ensure that the nut 42 is at least partly supported by the insert 20, especially in contact with at least a portion, preferably a sufficient portion, of the edge 18 of the insert 20 as shown in FIG. 6. Due to the bulge 17, the holder 10 can ensure a limit position of the screw-nut system 40 and ensure that the system 40 is well positioned relative to the position of the insert 20, more specifically relative to the second housing 12.

The assembly 30 of the present disclosure may be used as a mounting part or accessory, for example to fasten any product to a support, such as boxes, cable channels, fixing clamps, or other related products.

Although an overview of the inventive subject matter has been described with reference to specific example embodiments, various modifications and changes may be made to these embodiments without departing from the broader spirit and scope of embodiments of the present disclosure.

The invention claimed is:

1. An assembly, comprising:
   a U-shaped insert having an elongated portion defining two branches forming an open end of the insert; and
   a holder further comprising:
      a first housing having a U-shaped opening configured to receive the insert into the first housing in a first direction substantially perpendicularly to a plane of the holder, wherein the first housing extends within a plane of the holder, and
      a second housing extending within the plane of the holder and partially coextensive with the first housing, wherein the second housing is configured to receive the insert from the first housing and allow the insert to slide in a second direction substantially parallel to the plane of the holder so as to pass from the first housing into the second housing and wherein the second housing is configured to prevent movement of the insert out of the holder in a third direction substantially perpendicularly to the plane and opposite the first direction and/or to prevent movement of the insert out of the holder in the first direction.

2. The assembly of claim 1, wherein the opening is a through-opening.

3. The assembly of claim 1, wherein the second housing comprises a plurality of protrusions configured to prevent movement of the insert in the direction perpendicular to the plane.

4. The assembly of claim 1, wherein the first housing is separated from the second housing by an angled divider.

5. The assembly of claim 4, wherein the elongated portion is elastic and is configured to be compressed by the angled divider when the insert is moved between the first housing and second housing.

6. The assembly of claim 5, wherein each of the branches comprises a fork at a free end providing a first locking means for engaging with one protrusion of the second housing of the holder.

7. The assembly of claim 6, wherein the fork is bent outwardly so as to lock the insert in the second housing and prevent the insert from moving from the second housing to the first housing due to a divider acting as an abutment for the fork.

8. The assembly of claim 7, wherein the insert defines a hole or a recess as a second locking means located at an end opposite the open end to engage with a protrusion of the second housing.

9. The assembly of claim 1, wherein the second housing comprises two opposite sidewalls linked by a curved portion at one end of the second housing, and the first housing comprises at least a portion of the opposite sidewalls.

10. The assembly of claim 1, wherein the holder is formed of a plastic material.

11. The assembly of claim 1, wherein the insert comprises a metallic material.

12. The assembly of claim 1, wherein the insert is configured to be maintained locked in the second housing against a force up to at least 120 newtons applied to the insert in any direction perpendicular to the plane.

13. The assembly of claim 1, wherein the first and second housings are linked in a row.

14. The assembly of claim 1, wherein the second housing is offset from the first housing in the second direction.

* * * * *